Figures 1, 2:
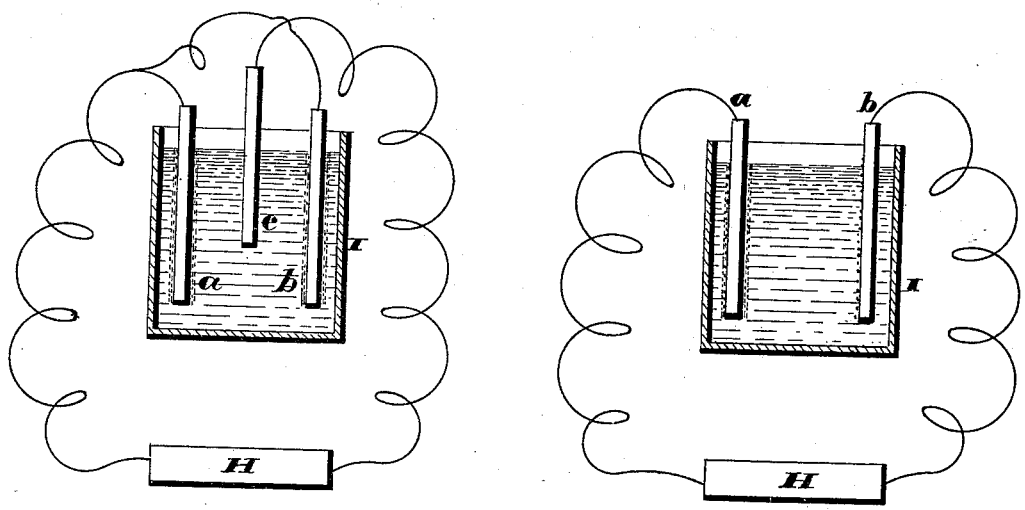

(No Model.)

2 Sheets—Sheet 1.

C. F. BRUSH.
SECONDARY BATTERY.

No. 264,211. Patented Sept. 12, 1882.

WITNESSES
E. A. Nottingham
W. H. Knight

INVENTOR
Chas. F. Brush.
By Leggett & Leggett,
Attorneys.

(No Model.) 2 Sheets—Sheet 2.
C. F. BRUSH.
SECONDARY BATTERY.
No. 264,211. Patented Sept. 12, 1882.
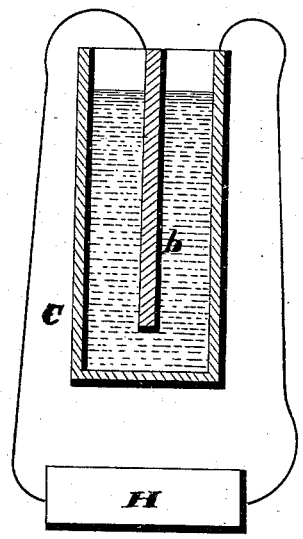

UNITED STATES PATENT OFFICE.

CHARLES F. BRUSH, OF CLEVELAND, OHIO.

SECONDARY BATTERY.

SPECIFICATION forming part of Letters Patent No. 264,211, dated September 12, 1882.

Application filed June 28, 1882. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use the same.

My invention, which, for reference and distinction from other similar inventions covered by applications for Letters Patent filed by me, I shall distinguish as "Case A, Division A," relates to secondary batteries or apparatus for the absorption of electric energy and subsequent redevelopment of the same; and it consists in the methods hereinafter described and claimed.

The most common form of secondary battery consists of two sheets or plates of lead placed near each other, but not in contact, and immersed in dilute sulphuric acid. These sheets are often of large surface, in which case they are frequently rolled in a cylindrical spiral, care being taken that they do not touch each other, so as to effect economy of space, and to expose both sides of each sheet to its neighbor. When an electric current is passed through such an apparatus water is decomposed, hydrogen is occluded by or combines with one of the lead plates, while oxygen combines with the other plate and forms a coating thereon of peroxide of lead. This oxide of lead, not being capable of combining with any acid, is not affected by the presence of the sulphuric acid employed. Now, if the exciting-current be removed it will be found that the apparatus has become a powerful battery, giving a current in a direction opposite to that of the exciting one; but this current is of short duration, and will not long remain stored. Repeated or long continued charging of the apparatus increases its capacity; but the latter will always remain small. It has been found, however, that the capacity of the apparatus may be greatly increased by reversing the charge from time to time frequently during the first few days, and more rarely afterward. This process may continue for several months, the apparatus continually improving rapidly at first, more slowly later. This series of reversals of charge constitutes the customary method of "forming" the plates of a secondary battery.

I have carefully investigated the chemical and mechanical action involved in the above-indicated processes, and have arrived at a satisfactory explanation of the results produced. The formation of peroxide of lead on one of the plates continues indefinitely, as long as the exciting-current is maintained, becoming constantly slower as the metallic surface acquires an increasing protection against further action by the constantly-increasing thickness of the coating of peroxide of lead thereon. Peroxide of lead being a good conductor of electricity, the coating thereof above described becomes a part of the conducting plate or element of the battery, and free oxygen is finally evolved at the outer surface of the coating. If, now, the exciting-current be stopped, "local action," somewhat similar to that in galvanic batteries and electrical in its nature, commences between the peroxide of lead and the packing or support of metallic lead with which it is in contact. By this local action the peroxide of lead is gradually reduced to a lower state of oxidation, while more of the metallic lead of the plate is oxidized by the oxygen thus made available. The fresh lead thus oxidized doubtless acquires the same conditions of oxidation that the original peroxide finally assumes; but the peroxide is never by this action reduced to the state of protoxide, as is proven by the color of the coating and the non-action on it of the ever-present sulphuric acid. When peroxide of lead is thus reduced to a state of lower oxidation it becomes useless for the development of a secondary current until freshly charged or reoxidized. Thus is explained, so far as the oxygen-plate is concerned, the cause of the gradual loss of the charge observed in lead secondary batteries. Further, since the conducting-power of peroxide of lead rapidly decreases as its oxygen is removed, the reason of the high electrical resistance of the oxidized plates, after long standing uncharged, is also explained. When such a plate as I have described—that is, one having gradually lost its original charge by local action—is recharged by an electric current, as at first, it will hold a larger charge than before, because all of the lower oxide of lead is now raised to the condition of peroxide, and thus more of the latter is present than at the previous time of charging. This explains why the oxygen-plate of secondary batteries constantly increases in capacity even though the exciting-current be applied at long intervals.

Let us now consider what takes place at the opposite side of the secondary battery—that is, the action on the lead plate where the hydrogen appears. Here the hydrogen is absorbed at the surface of the plate, being simply occluded, or more probably forming a definite but feeble chemical combination with the lead. If such a combination exists, it is a nearly or quite stable one so far as local action is concerned, for experience shows that the capacity of the plate for the reception of hydrogen increases very slowly, if at all, when the plate is left charged a long time, but without the action of the exciting-current. Even the action of the exciting-current increases the capacity of the hydrogen-plate very slowly, indeed, as compared with the improvement in the oxygen-plate during the same time. The capacity of the hydrogen-plate never becomes at all considerable when it is subjected to the above action alone. Hence in practice the oxygen-plate soon acquires much greater capacity than the hydrogen-plate; but this is of no advantage, since its usefulness is limited by that of the hydrogen-plate; but if, now, the charge of the two plates be reversed by changing the direction of the exciting-current, the former hydrogen-plate will absorb oxygen freely, as did the other plate at first, while the former oxygen-plate will have its coating of oxide of lead reduced to the metallic state by nascent hydrogen evolved upon it, and will thus be left with a corresponding coating of porous lead. This porous metal is now in a condition to absorb and retain an amount of available hydrogen about equivalent to the available oxygen which it before held. Thus it will be seen that the simple act of reversing the charge of the two plates increases the capacity of the apparatus up to a point attained only by the oxygen-plate before the reversal. Again, what is now the oxygen-plate continues to improve, as in the first instance, while the hydrogen-plate remains nearly or quite stationary in this respect. Hence after a time a further increase of capacity in the apparatus may be effected by another reversal. Thus is explained the reason for the many reversals of charge customary in forming the plate.

When a previously-excited secondary battery is discharged the peroxide of lead is thereby reduced to a state of lower oxidation, as already explained in connection with the spontaneous loss of charge. Thus what was at first a good conducting coat or envelope on the metal plate is now reduced to a poor conductor, as previously explained, while at the same time pure water is formed within the mass of lead oxide by the combination of hydrogen with a portion of the oxygen of the peroxide of lead, and since pure water is a very poor conductor of electricity, a further barrier to the passage of current between the sulphuric-acid solution and the metallic plate within the envelope of lead oxide is raised. These two causes (lower oxidation and presence of pure water) account, so far as the oxygen-plate is concerned, for the increase of resistance in secondary batteries during their discharge, and especially toward the end of the process. In the case of the hydrogen-plate, pure water is also formed by the union of oxygen with its hydrogen, whereby the necessary liquid conductor within the porous metal has its resistance largely increased. The cause of the gradual spontaneous loss of charge in case of the hydrogen-plate of secondary batteries is not the same as that already described in connection with the oxygen-plate. The hydrogen in this case appears to be gradually dissolved and carried away from its plate by the dilute sulphuric acid, which then discharges it gradually into the atmosphere. If, in charging a hydrogen-plate, a chemical compound of lead and hydrogen is formed, as I have before suggested, this compound would appear to be gradually decomposed in presence of the acid-water, giving up its gas to the latter.

There are certain evils incident to the above-described process of forming the lead plates of secondary batteries, which attendant evils prevent the attainment of the best results and limit the ultimate capacity of the apparatus to a comparatively small field of usefulness. The coating of peroxide of lead, which is formed on one of the plates, necessarily occupies more space than did the metallic lead which it contains. The shell of oxide must then expand in forming. To accomodate this expansion, which evidently occurs in all directions, the structure of the deposit must be more or less broken up at numerous points, or else the lead plate itself must expand. The occurrence of the latter action may readily be observed when the lead sheet is thin. When, now, the direction of charge is reversed, by which operation the oxide of lead is reduced to the metallic state, the previously-expanded mass shrinks. Both the expansion and subsequent shrinkage may be illustrated by treating one side only of a sheet of lead, the other side being protected from action by varnish or otherwise. When such a plate is oxidized the exposed side becomes convex. When the oxide is subsequently reduced this side becomes concave. During the process of reduction the shrinkage does not occur in all parts of the mass at once, as the reduction is not simultaneous in all parts, but is progressive. The converse of this is true when the reduced lead is again oxidized. Hence there is a disintegrating action in the changing mass itself, as well as between it and the solid plate behind it. This alternate expansion and contraction of the active and valuable portion of the lead plate does not lead to serious disturbance when it is allowed to occur only once or a very small number of times; but if these changes are many times repeated the coating peels off from the lead plates to a considerable extent, and thus becomes useless. This evil is especially noticeable in the case of thick deposits. Again, every time the deposit of oxide of lead is reduced a notable quantity of sulphate of lead is formed within the mass. This inert and useless substance when allowed thus to form soon exercises a very deleterious influence, wasting in its formation the otherwise available oxide of lead, stopping the pores of the essentially porous mass, and tending to disintegrate the latter by occupying a much larger space than the oxide of lead from which it is formed. The reduction of the oxide of lead is also attended with danger of separating the mass from its supporting lead plate by the liberation of gas between the two, especially when the reducing-current is of sufficient strength to effect the change at all rapidly. The frequent reversal of charge is also expensive, in that much energy of charging current is wasted at each operation. Further, it will be seen that the oxygen, which is the active though slow agent on improving or developing the plates, acts not on both plates simultaneously, but on only one at a time.

My method or process of forming the plates or elements of secondary batteries avoids or eliminates the above-enumerated evils entirely, whereby with plates of any given size or form or construction I produce ultimately or within a given time an apparatus of much greater capacity than was heretofore found possible.

My process consists in charging the plates which are ultimately to constitute the battery in such a manner that a coating of peroxide of lead of sufficient thickness is formed on both of them. These plates are then associated together in the usual manner, and an electric current passed through the apparatus in the manner common in charging, whereby one of the plates remains unchanged and constitutes the oxygen element of the battery, while the other has its charge reversed and now constitutes the hydrogen element of the battery.

In Figure 1, $a$ and $b$ are lead plates, which are ultimately to form the secondary battery. They are both connected, as shown, to the oxygen-producing pole of a current-generator, H. $c$ is a third plate, similar or not to the others, and connected to the hydrogen-producing pole of the generator H. All the plates are immersed in dilute sulphuric acid contained in the vessel I.

Fig. 2 shows the plates $a$ $b$ arranged for the reversal of the charge in $b$, the latter being now connected with the hydrogen-producing pole of the generator H. This is also the arrangement for charging the battery for use after its plates are duly formed.

Figure 4:
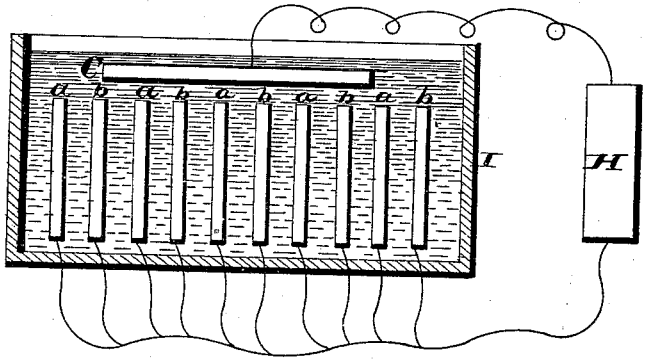

Figs. 3 and 4 show modified constructions. Obviously the arrangements shown in Figs. 1 and 2 may be modified almost indefinitely while producing the same result. Many plates $a$ $b$ may be charged at once, using only one plate $c$. This constitutes one of the cardinal and essential features of my present invention, which, in brief, may be said to consist in a method of forming at one time and in a single receptacle or bath elements to be afterward coupled or associated to constitute the electrodes of an indefinite number of individual batteries or cells of a battery by associating in a single bath or receptacle an indefinite number of plates $a$ $b$, all of which are connected with the oxygen-producing pole of a suitable electric-current generator, and any suitable electrode, $c$, of lead, copper, or equivalent conductor, connected with the hydrogen-producing pole of said generator, and then, by passage of the electric current through the bath, as already described, sufficiently peroxidizing the plates $a$ $b$, which plates or elements are afterward to be coupled or associated to constitute the electrodes of an indefinite number of individual batteries or cells of a battery, one of said plates or electrodes in each associated pair or set being afterward reduced from its former peroxidized state to a metallic condition to constitute the hydrogen element of said pair or set.

Fig. 4 of the drawings diagrammatically illustrates a single bath or receptacle I, containing a number of plates or elements $a$ $b$, that are all connected with the oxygen-producing pole of the electric-current generator H. C is an electrode of lead, copper, or equivalent conductor, connected with the hydrogen-producing pole of the generator.

The vessel I may be of lead or copper and constitute the plate $c$, as shown in Fig. 3. The plate $c$ may consist of one or more previously charged plates $a$ or $b$, which thus become reversed, and are then ready without further treatment to be paired with other charged plates $a$ or $b$ in the construction of secondary cells ready for use. The plates $a$ $b$, while acquiring their coating of lead peroxide, may for this purpose be charged continuously; or (and this is equally effective, and more convenient) they may be charged at intervals only, short at first, which may be increased in length as the process progresses, thus allowing the local action between the peroxide of lead already formed and the metallic lead to continue the oxidizing process during the time the charging-current is not acting. I have before described this local action and the effects thereof. Several months of continuous or intermittent charging is required when ordinary rolled sheet-lead alone is employed for the plates $a$ $b$, in order to produce a satisfactory coating of peroxide of lead. The process of reversing the charge of one of the plates $a$ or $b$ need not occupy more than a few hours. It will be apparent that this process of forming possesses among many of its advantages that of producing a given capacity (supposing such to be attainable by the old method) in the apparatus under treatment in very much less time than would be required by the forming process commonly employed, in that both plates simultaneously, instead of one at a time, are acted upon by the oxygen, which is the active agent in improving or developing the plates.

My process of forming the plates of secondary batteries is applicable not only to the flat or plain plates ordinarily used, but equally so to corrugated and ribbed or honey-combed plates, and also especially to plain corrugated or honey-combed or ribbed plates coated or filled with spongy or porous or reduced lead, as set forth in several other of my applications filed of even date herewith. This case is a division of my prior application, designated as "Case A," filed June 9, 1881, and to distinguish this case from others I designate it as "Division A of Case A."

Having fully described my invention, what I claim as new, and desire to secure by Letters Patent, is—

1. The method or process, substantially as herein set forth, consisting in simultaneously charging in a single bath or apparatus a number of secondary battery plates or elements with an active or absorbing coating, and afterward associating or coupling said prepared plates or elements in pairs or sets as electrodes of individual batteries or cells of a battery.

2. The method or process, substantially as herein set forth, consisting in simultaneously peroxidizing in a single bath or apparatus two or more secondary battery plates or elements, then coupling or associating said peroxidized elements as electrodes of individual batteries or cells of a battery, and then reducing one of the electrodes in each of said batteries or cells to form a hydrogen element.

3. The method or process, substantially as herein set forth, consisting in placing in a single bath or apparatus two or more plates or elements, all connected with the oxygen-pole of a suitable electric-current generator, and an electrode of lead, copper, or equivalent conductor, connected with the hydrogen-pole of said generator, and then by the action of the current of said generator simultaneously forming all the plates or elements connected with said oxygen-pole, and after said forming is completed coupling or associating said plates or elements, so that they shall constitute the electrodes of individual secondary batteries or cells of a battery.

4. The method or process, substantially as herein set forth, consisting in placing in a single bath or apparatus two or more plates or elements, all connected with the oxygen-pole of a suitable electric-current generator, and an electrode of lead, copper, or equivalent conductor, connected with the hydrogen-pole of said generator, and then by the action of the current of said generator simultaneously forming all the plates or elements connected with said oxygen-pole, and after said forming is completed coupling or associating said plates or elements, so that they shall constitute the electrodes of individual secondary batteries or cells of a battery, and then reducing one of each said pair or set of associated electrodes from its oxidized state to a metallic state to constitute the hydrogen element of the battery or cell wherein it is located.

In testimony whereof I have signed my name to this specification in the presence of two subscribing witnesses.

CHARLES F. BRUSH.

Witnesses:
LEVERETT L. LEGGETT,
WILLIAM A. GALPIN.